United States Patent [19]
Nagumo et al.

[11] 3,952,995
[45] Apr. 27, 1976

[54] LIFTER MECHANISM FOR SPRING-LOADED VALVE

[75] Inventors: Shin-Ichi Nagumo, Yokohama; Tatuhiro Yuta, Yokosuka, both of Japan

[73] Assignee: Nissan Motor Company Limited, Yokohama, Japan

[22] Filed: May 5, 1975

[21] Appl. No.: 574,258

[30] Foreign Application Priority Data
May 11, 1974 Japan.................................. 49-52497

[52] U.S. Cl................................ 251/232; 74/110; 251/58
[51] Int. Cl.²......................................... F16K 31/44
[58] Field of Search...................... 74/110; 137/445; 251/58, 232, 244, 279, 280

[56] References Cited
UNITED STATES PATENTS

| 1,929 | 1/1841 | Wilder | 251/232 |
| 1,561,544 | 11/1925 | How | 251/280 |
| 2,738,748 | 3/1956 | Hecht | 74/110 |
| 3,684,237 | 8/1972 | Hyde et al. | 251/58 |

*Primary Examiner*—Martin P. Schwadron
*Assistant Examiner*—George L. Walton

[57] ABSTRACT

A linkage for pulling a valve stem against resistance of a compression spring comprises three link members; a first link member coaxially fixed to and extending from the stem, a second member pivoted at an end to the extending end of the first member and a third link member pivoted at an end to the second member at an intermediate point of the second member and pivotally mounted on a fixed shaft at the other end. An actuator exerts a constant force on the free end of the second link and rotates the second link about both the pivots for the first and third links, resulting in pulling the valve stem with a progressively increasing force.

6 Claims, 5 Drawing Figures

LIFTER MECHANISM FOR SPRING-LOADED VALVE

This invention relates to a lifter mechanism for spring-loaded valves for controlling fluid flows and more particularly to a mechanical linkage which serves as an essential part of the lifter mechanism.

Spring-loaded valves of the normally open type are widely used in various fluid circuits. In these valves, a valve element is normally held spaced from a valve seat by a spring pressure. The valve closure is accomplished by pulling the valve element towards the valve seat with a pull force of a larger magnitude than the compression force of the spring. Since the pull force is usually of a constant magnitude but the compression force increases as the spring is compressed with the movement of the valve element, a cancellation effect of the compression force on the pull force increases as the valve element nears the valve seat and becomes maximum when the closure is accomplished. Such an increase in the cancellation effect or decrease in an effective valve closing force is unfavorable to the cut-off characteristic of the valve.

It is therefore an object of the present invention to provide a valve lifter mechanism for operating a spring-loaded valve of the normally open type by means of an actuator of a constant power capacity, the lifting force of which mechanism increases with increase in the lift at a variable rate greater than the increasing rate of a compression force of the spring.

The present invention is concerned with a conventional valve for controlling a fluid flow through a passage, which valve has a valve housing, a valve seat formed in the housing, a valve element formed on an axially movable valve stem, an end of which stem extends outwardly of the housing, and a compression spring arranged such that the valve element is normally held spaced from the valve seat due to a compression force exerted on the stem.

According to the invention, there is provided a valve lifter mechanism for such a valve, comprising a first link member fixed to and extending from the extending end of the valve stem in the same axial direction, a second link member pivoted at an end thereof to the extending end of the first link member, a third link member pivotally mounted at a first end thereof on a shaft which is fixedly supported by a stationary member, a second end of the third link member being pivoted to the second link member at an intermediate point of the latter, and an actuating means for exerting a force on the other end of the second link member and rotating the second link member about both the pivots for the first and third link members.

The longitudinal axis of the aforementioned shaft preferably intersects the longitudinal axis of the first link member perpendicularly, and the aforementioned intermediate point is preferably at a distance equal to the length of the third link member from the pivoted end of the second link member.

A lifter mechanism of the invention has the advantage that either a pulling or pushing force of a constant magnitude exerted on the second link member results in a pull force on the valve stem, which latter force increases at a nonlinear and greater rate compared with a linear increasing rate of the spring force.

The invention will be fully understood from the following detailed description of a preferred embodiment thereof with reference to the accompanying drawings, in which.

Figures 1, 2:
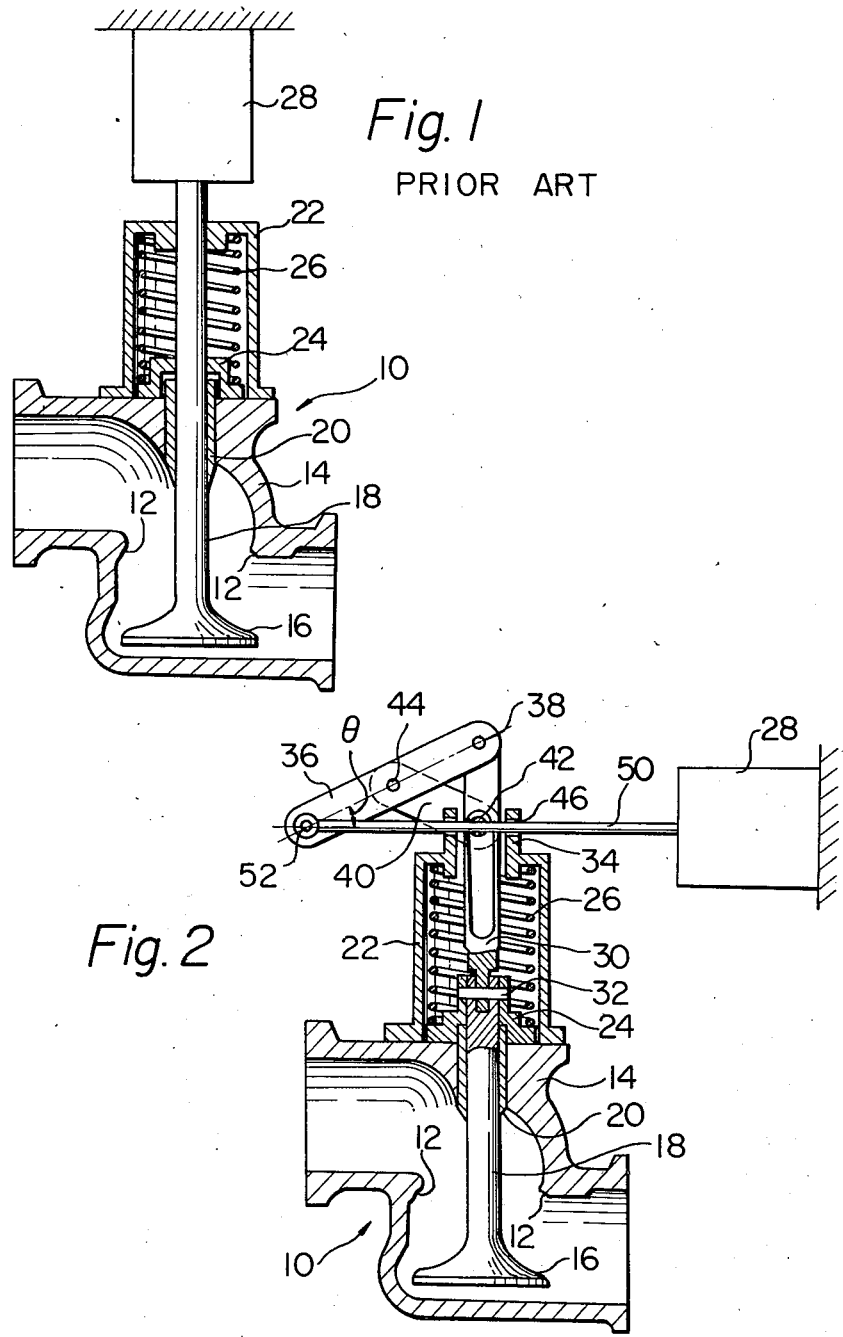
FIG. 1 shows sectional side elevation of a conventional spring-loaded valve of the normally open type.
FIG. 2 shows a side elevation, partly in section, of the same valve which is equipped with a lifter mechanism according to the invention and kept in an open state.

Referring at first to FIG. 1, the reference numeral 10 indicates generally a conventional spring-loaded valve of the normally open type which is widely used in various fluid circuits. A conical valve seat 12 is formed in a valve housing 14, and a valve face 16 is formed on a mushroom-shaped valve stem 18 at the umbrella-like top. The stem 18 extends outwardly of the housing 14 through a stem guide 20. A cylindrical spring housing 22 is mounted on the valve housing 14 allowing the valve stem 18 to pass therethrough. An annular spring retainer 24 is fixed to the valve stem 18 within the spring housing 22, and a compression spring 26 is installed in the spring housing 22 between the retainer 24 and an extending end of the housing 22. The extending end of the stem 18 is connected to an actuator 28. The compression spring 26 and the retainer 24 are arranged such that the valve stem 18 is normally pushed downwardly in FIG. 1 and that the valve face 16 is held at a fully open position at a distance from the valve seat 12. On the other hand, the spring 26 and the retainer 24 are designed so as to allow the valve face 16 to come into a complete contact with the valve seat 12 with the stem 18 is pulled by the actuator 28. The actuator 28 and the stroke or lift of the stem 18 are of course designed such that the valve face 16 is pushed against the valve seat 12 with a force of a sufficient magnitude. The spring 26, however, is compressed gradually during the lift of the valve face 16 and exerts an increasing pressure on the retainer 24. The pull force on the stem 18 by means of the actuator 28 is cancelled to a certain extent by the spring pressure, and the cancellation effect becomes maximum when the closure is accomplished. Thus the cut-off characteristic of this valve 10 is not fully satisfactory unless the actuator 28 has a very large power capacity.

Figure 3:
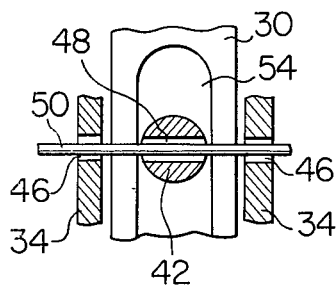
FIG. 3 is a fragmentarily enlarged view of the same lifter mechanism.

Referring now to FIGS. 2 and 3 which illustrate a preferred embodiment of the invention, the valve 10 is equipped with a mechanism linkage (no numeral) according to the invention which is interposed between the valve stem 18 and the actuator 28. In the spring housing 22, the spring retainer 24 is fixed to the stem 18 and normally positioned at the lower end (as viewed in FIG. 2) of the spring housing 22 under the load of the compression spring 26. The valve stem 18 is shortened compared with fundamentally the same stem 18 of FIG. 1 and connected within the spring housing 22 to a bar-shaped first link member 30 by means of a connecting pin 32. The link 30 extends either coaxially or parallel to the stem 18. It will be convenient to fix both the spring retainer 24 and the link 30 to the stem 18 with a single connecting pin 32 as shown in FIG. 2. The extending or upper end of the spring housing 22 is shaped to provide a tubular projection 34, which allows the link 30 to pass therethrough either loosely or slidably. It will be understood that the valve stem 18 may be made longer than the illustrated one so as to serve also as the first link member 30. The link 30 protrudes from this guideway 34 and is pivoted at the extending end thereof to a bar-shaped second link member 36 by a linking pin 38. A bar-shaped third link member 40 is pivotally mounted at one end thereof on a shaft 42 which is fixed to the tubular projection 34. The shaft 42 is arranged parallel to the linking pin 38 and perpendicularly intersects the longitudinal axis of the first link member 30. The third link member 40 is usually shorter than the second link member 36; in the illustrated embodiment, half as long as the second link member 36. The other end of the third link member 40 is pivoted to the second link member 36 by a linking pin 44 at the middle of the latter, so that the distance between the linking pins 38 and 44 is equal to the effective length of the third link member 40.

The wall of the tubular projection 34 and the shaft 42 have through holes 46 and 48, respectively, formed on the same axis perpendicular to both the shaft 42 and the first link member 30. An actuating rod 50 passes slidably through these holes 46 and 48 and is pivoted at one end thereof to the free end of the second link member 36 by a pin 52. The other end of this rod 50 is connected to the actuator 28. The first link member 30 is arranged so as to move relatively to the shaft 42 without making any substantial contact with the actuating rod 50. For example, the first link member 30 has a guide slot 54 for allowing the shaft 42 to pass therethrough as shown in FIG. 3.

Figure 4:
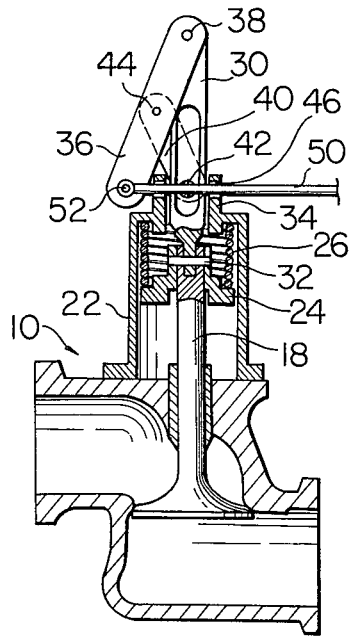
FIG. 4 shows the same as FIG. 2, but gives a view in a closed valve state.

Closure of the valve 10 is accomplished in the following manners. The actuator 28 pulls the actuating rod 50 to the right as viewed in FIG. 2 and causes the second link member 36 to rotate anticlockwise about the linking pin 38. Since the second link member 36 is joined at an intermediate point thereof with the third link member 40 which is mounted on the fixed shaft 42, the second link member 36 tends also to rotate anticlockwise about the pin 44. The latter rotational movement of the second link member 36 causes the pin 38 to move vertically upwards. Thus, the first link member 30 and the valve stem 18 are pulled vertically upwards conquering the resistance of the compression spring 26 until the valve face 16 is seated on and pushed against the valve seat 12. FIG. 4 shows the valve 10 and the linkage of FIG. 2 in the closed state.

As will be understood from FIGS. 2 and 4, a rightangled triangle is always formed with the shaft 42 and pins 38, 52 as the apexes thereof. The first link member 30 and the actuating rod 50 serve as the two sides of the triangle forming the right angle. Since one of these two sides, i.e., the first link member 30 can move only axially or vertically, the movement of the other side or the actuating rod 50 is limited to the axial or horizontal one even when the second link member 36 makes a rotational movement. The actuator 28, therefore, can be held fixed as it is in the case of FIG. 1. It will be apparent that the actuator 28 may be of any conventional type; for example, of an electromagnetic type or a hydraulic cylinder-piston type. A manual force also may serve as the actuator 28.

Figure 5:
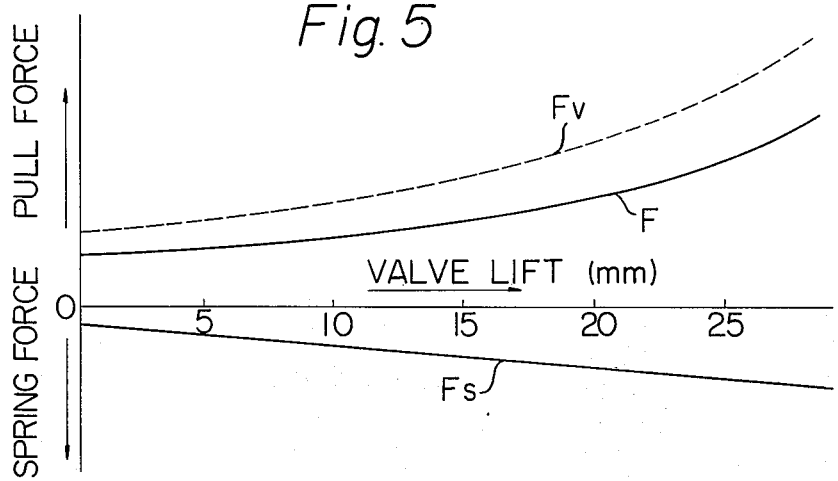
FIG. 5 is a graph showing the variations in the pull force and compression force on the valve of FIG. 2 during operation of the lifter mechanism of FIG. 2.

A valve closing or lifting force F with respect to the valve 10 and the lifter mechanism of FIGS. 2 and 3 will be described hereinafter with reference to the graph of FIG. 5.

If the full force of the actuator 28 is $Fa$ and the second link member 36 makes a variable angle $\theta$ between the actuating rod 50, then an axial pull force $Fv$ on the valve stem 18 is expressed by $$Fv = Fa \cdot \tan\theta$$

The angle $\theta$ increases as the second link member 36 rotates and the first link member 30 is pulled upwards, resulting in a nonlinear increase of the value of $\tan \theta$. Accordingly, the pull force $Fv$ increases progressively and nonlinearly as the valve lift proceeds.

On the other hand, the stem 18 is under the influence of a compression force $Fs$ given by the compression spring 26. Since the effective lifting force F is expressed by $(Fv - Fs)$, the magnitude of the lifting force F increases nonlinearly when $Fv$ is greater than $Fs$.

Thus, the valve face 16 is lifted with the lifting force F, the increasing rate of which exceeds the increasing rate of the compression force or resistance $Fs$, so that the lifting can be accomplished smoothly. When the valve face 16 is seated on the valve seat 12 at the maximum lift, the valve face 16 is strongly pushed against the seat 12 with a maximum lifting force F.

When the actuator 28 is deactivated for returning the valve 10 into the open state, the spring retainer 24 is pushed downwards in FIG. 4 with the compression force $Fs$ of the spring 26. Then the first link member 30 moves downwards and causes the second link member 36 to make a clockwise rotational movement about the linking pin 38. As a result, the actuating rod 50 is pulled leftwards in FIG. 4 until the retainer 24 and the entire linkage returns to the respective positions in FIG. 2.

From the foregoing description it will be apparent that a linkage according to the invention is not necessarily arranged just as illustrated in FIG. 2. The third link member 40 is allowed to have an optional length relatively to the second link member 36. The stationary shaft 42 may lie in a vertical plane distant from the longitudinal axis of the first link member 30 although the distance is shorter the better for a smooth operation of the linkage. The distance between the linking pins 44 and 38 may be different from the length of the third link member 40. The actuating rod 50 may be omitted if the actuator 28 is arranged so as to move the second link member 36 directly, or arranged slant with respect to the first link member 30. The arrangement as illustrated in FIG. 2 has a merit that the actuation rod 50 is allowed to move always on a horizontal axis. When the actuating rod 50 is arranged substantially perpendicular to the first link member 30 as in FIG. 2, it is possible to omit the third link member 40 provided that the actuating rod 50 is supported by a stationary guide member (not shown) which allows the rod 50 to move exclusively along its axis.

When a manual operation is intended, the second link member 36 is preferably made as long as possible so that a multiplied pull force on the first link member 30 may be attained. Unlike the illustration, the actuating rod 50 may be extended to the left of the pin 52 if pushing of the actuating rod is preferred to pulling for causing the closure of the valve 10.

What is claimed is:

1. A valve lifter mechanism for a fluid flow control valve, which valve has a valve housing, a valve seat formed in the housing, a valve element formed on an axially movable valve stem, one end of the stem extending outwardly of the housing, and a compression spring arranged such that the valve element is normally held spaced from the valve seat due to a compression force exerted on the stem, the lifter mechanism comprising a first link member fixed to and extending from the extending end of the valve stem in the same axial direction, a second link member pivoted at a first end thereof to an extending end of said first link member, a third link member pivotally mounted at a first end thereof on a shaft fixedly supported by a stationary member, a second end of said third link member being pivoted to said second link member at an intermediate point of the latter, and an actuating means for exerting a force on the other end of said second link member and rotating the second link member about both the pivots for the first and third link members.

2. A valve lifter mechanism as claimed in claim 1, wherein said actuating means consist of an actuating rod pivoted to said other end of second link member and extended therefrom, and an actuator for moving said rod axially.

3. A valve lifter mechanism as claimed in claim 1, wherein the longitudinal axis of said shaft intersects the longitudinal axis of said first link member perpendicularly.

4. A valve lifter mechanism as claimed in claim 3, wherein said intermediate point is at a distance equal to the length of said third link member from said first end of said second link member.

5. A valve lifter mechanism as claimed in claim 4, wherein said second link member is twice as long as said third link member, and said actuating means consist of an actuating rod pivoted to said other end of said second link member and extended therefrom perpendicularly to said first link member and an actuator for moving said rod axially.

6. A valve lifter mechanism for a fluid flow control valve as set forth in claim 1, the lifter mechanism comprising a first link member fixed to and extending from the extending end of the valve stem in the same axial direction, a second link member pivoted at an end thereof to an extending end of said first link member, and an actuating rod pivoted to the other end of said second link member and extended therefrom, said actuating rod being arranged such that the longitudinal axis of said actuating rod intersects the longitudinal axis of said first link member substantially perpendicularly.

* * * * *